United States Patent [19]

Kurtz

[11] 4,230,405

[45] Oct. 28, 1980

[54] ELECTRONIC IMAGING APPARATUS USING MULTICOLOR ELECTROPHOTOSENSITIVE PARTICLES

[75] Inventor: Clark N. Kurtz, Rochester, N.Y.

[73] Assignee: Eastman Kodak Company, Rochester, N.Y.

[21] Appl. No.: 53,151

[22] Filed: Jun. 28, 1979

[51] Int. Cl.³ .......................................... G03G 15/01
[52] U.S. Cl. ...................................... 355/4; 355/3 P; 430/32; 430/41; 430/42
[58] Field of Search ..................... 355/4, 3 P; 430/32, 430/35, 41, 42, 44; 204/181 PE, 300 R, 300 PE; 358/75

[56] References Cited

U.S. PATENT DOCUMENTS 4,125,322  11/1978  Kaukeinen .............................. 355/4
4,168,118   9/1979  Mir ..................................... 355/3 P

*Primary Examiner*—R. L. Moses
*Attorney, Agent, or Firm*—J. D. Husser

[57] ABSTRACT

Electrically controlled color imaging with a mixture of electrophotosensitive particles of different color types is effected using a photoconductive insulator layer as a particle addressing electrode. A layer of such mixture adjacent the electrode is uniformly exposed by time-separated, different-color, light pulses and discrete portions of the photoconductor are selectively addressed, by activating radiation, in synchronization with the pulses and according to the image information of color image to be reproduced.

20 Claims, 4 Drawing Figures

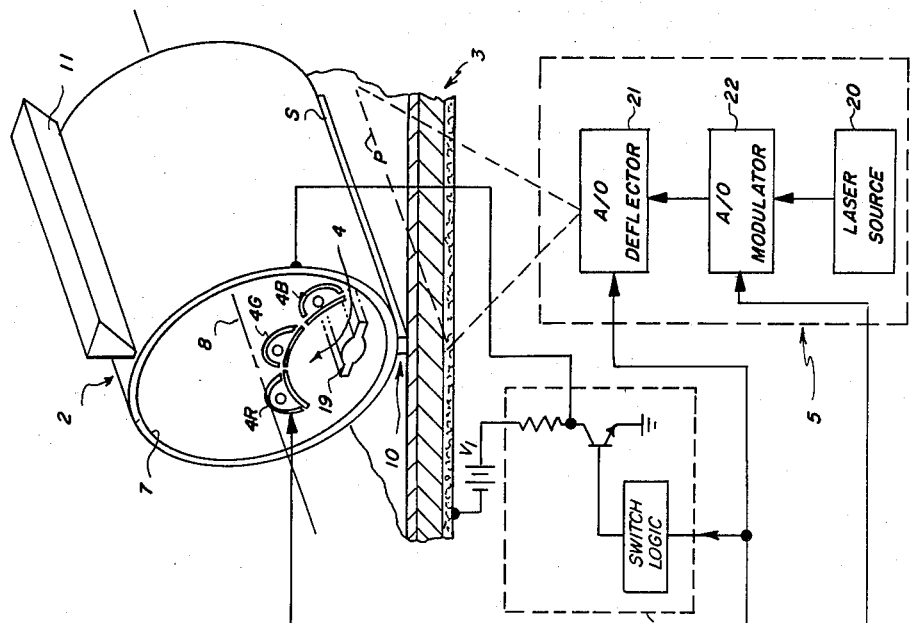
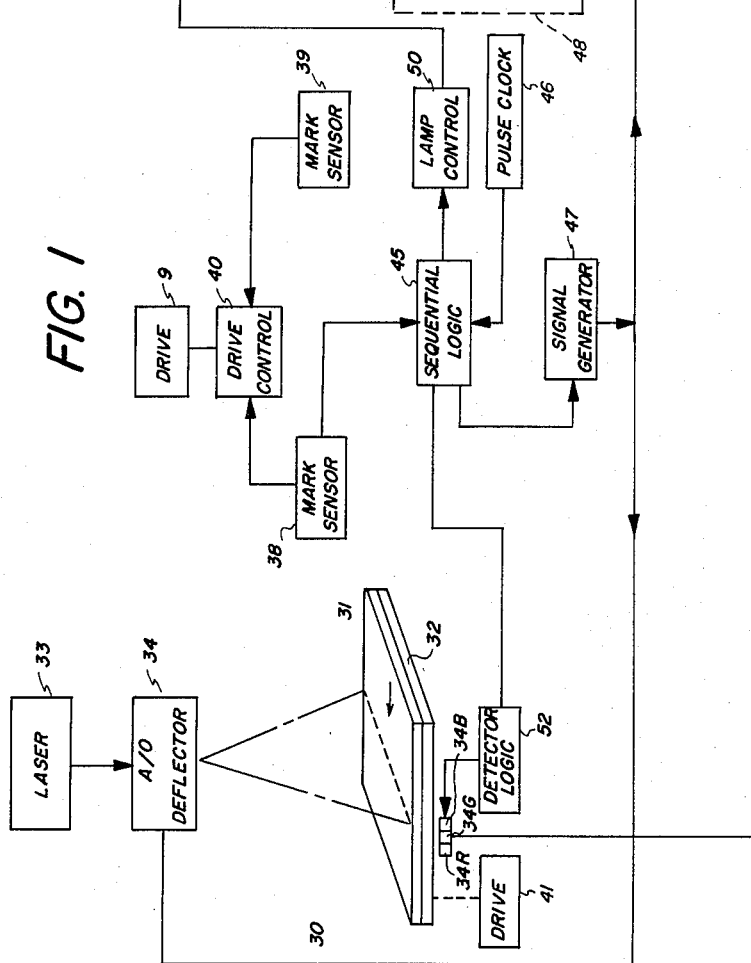

ELECTRONIC IMAGING APPARATUS USING MULTICOLOR ELECTROPHOTOSENSITIVE PARTICLES

CROSS REFERENCE TO RELATED APPLICATIONS

Reference is made herein to U.S. Application Ser. No. 821,114 entitled ELECTRONIC IMAGING APPARATUS USING MULTICOLOR ELECTROPHOTOSENSITIVE PARTICLES and filed Aug. 2, 1977 in the name of Jose M. Mir.

BACKGROUND OF THE INVENTION

1. Field of the Invention

The present invention relates to apparatus for migration imaging using a mixture of differently colored electrophotosensitive particles, and more particularly to improved apparatus of the type which electrically addresses discrete picture elements (pixels) of such mixture in an imagewise timed relation with exposure of the pixels by time-separated, differently-colored, light pulses.

2. Description of the Prior Art

Photoelectrophoretic migration imaging involves the light image exposure of a liquid suspension, comprising dielectric liquid carrier and differently-colored, photoconductive toner particles, while between electrodes that provide a migration inducing field. U.S. Pat. No. 3,140,175 to Kaprelian discloses early procedures and apparatus of this type. In operation, the suspended toner particles attain a charge and migrate from the suspension to one of the electrodes. Upon exposure the illuminated particles migrate to the other electrode in accordance with the exposing light image pattern. Various embodiments for photoelectrophoretic migration imaging have been subsequently proposed (e.g., see U.S. Pat. No. 3,384,565). Recently a photoimmobilized electrophoretic migration imaging method has been described wherein the light-exposed, photoconductive toner particles are retained at the electrode to which they first migrate and unexposed particles change charge and migrate to the other electrode (see, e.g., U.S. Pat. No. 3,976,485).

Certain difficulties have arisen during efforts to commercialize such migration imaging systems. For example, high density images are difficult to attain in such systems. Further, in color imaging using this technique, it would be useful to have capabilities for color adjustment without inserting filter elements and image sense reversal without the forming of internegatives. Also, it is envisioned that office systems of the future may utilize image transmission, and it is not apparent that traditional, optically-addressed copiers can provide such a feature.

In view of one or more of the problems and/or desired capabilities noted above, there have been described in literature proposals for electro-optically-addressable photoelectrophoretic imaging systems. For example U.S. Pat. No. 3,663,396 and British Pat. No. 1,341,690 respectively disclose electronic address of a color cathode ray tube and an electro-luminescent panel used as the exposure source for such an imaging system. Another electro-optical approach is disclosed in U.S. Pat. No. 4,058,828. In this device a multicolor laser beam is scanned point by point across the imaging area and modulated according to the point-by-point color content of the image to be reproduced. These approaches offer the potential for improved density, color adjustment and electronic transmission of images; however, the exposure elements and control systems for such systems are fairly complicated and expensive.

Commonly assigned co-pending U.S. Application Ser. No. 821,114 entitled ELECTRONIC IMAGING USING MULTICOLOR ELECTROPHOTOSENSITIVE PARTICLES and filed Aug. 2, 1977 discloses an approach which has been found useful for obviating the above-described difficulties. In that approach, discrete pixels of migration imaging mixture are individually addressed by imagewise modulated electrical fields in timed relation to a series of differently colored light pulses. However in certain applications, for example those requiring high resolution, difficulties have been encountered from the viewpoint of fabricating the discrete electrode arrays used for addressing the imaging mixture.

SUMMARY OF THE INVENTION

The present invention pertains to improved apparatus for producing color images with developer mixtures that contain electrophotosensitive particles of different color types, respectively sensitive to light of different colors. It is one objective of the present invention to provide such apparatus which is relatively simple to fabricate and which can produce high resolution images.

The above and other objects and advantages are achieved according to the present invention by provision of means for exposing successive strips of an imaging layer of such a mixture to successive series of time-separated light pulses, the pulses in each series being respectively of the different colors to which the different particle types are sensitive; addressable electrode means adjacent such layer for providing discrete electrical fields across individual pixels of exposed strips in response to an addressing activation by electro-magnetic radiation; and means for selectively exposing said electrode means to such activating radiation in synchronization with said light pulses and according to the color information of the image to be reproduced.

DESCRIPTION OF THE DRAWINGS

The subsequent description of preferred embodiments of the present invention is made with reference to the attached drawings which form a part hereof and in which:

FIG. 1 is a schematic and block diagram illustration of color imaging apparatus according to one embodiment of the present invention;

FIG. 2 is an enlarged side view of one portion of the FIG. 1 apparatus;

DETAILED DESCRIPTION OF THE PREFERRED EMBODIMENTS

Figures 3, 4:
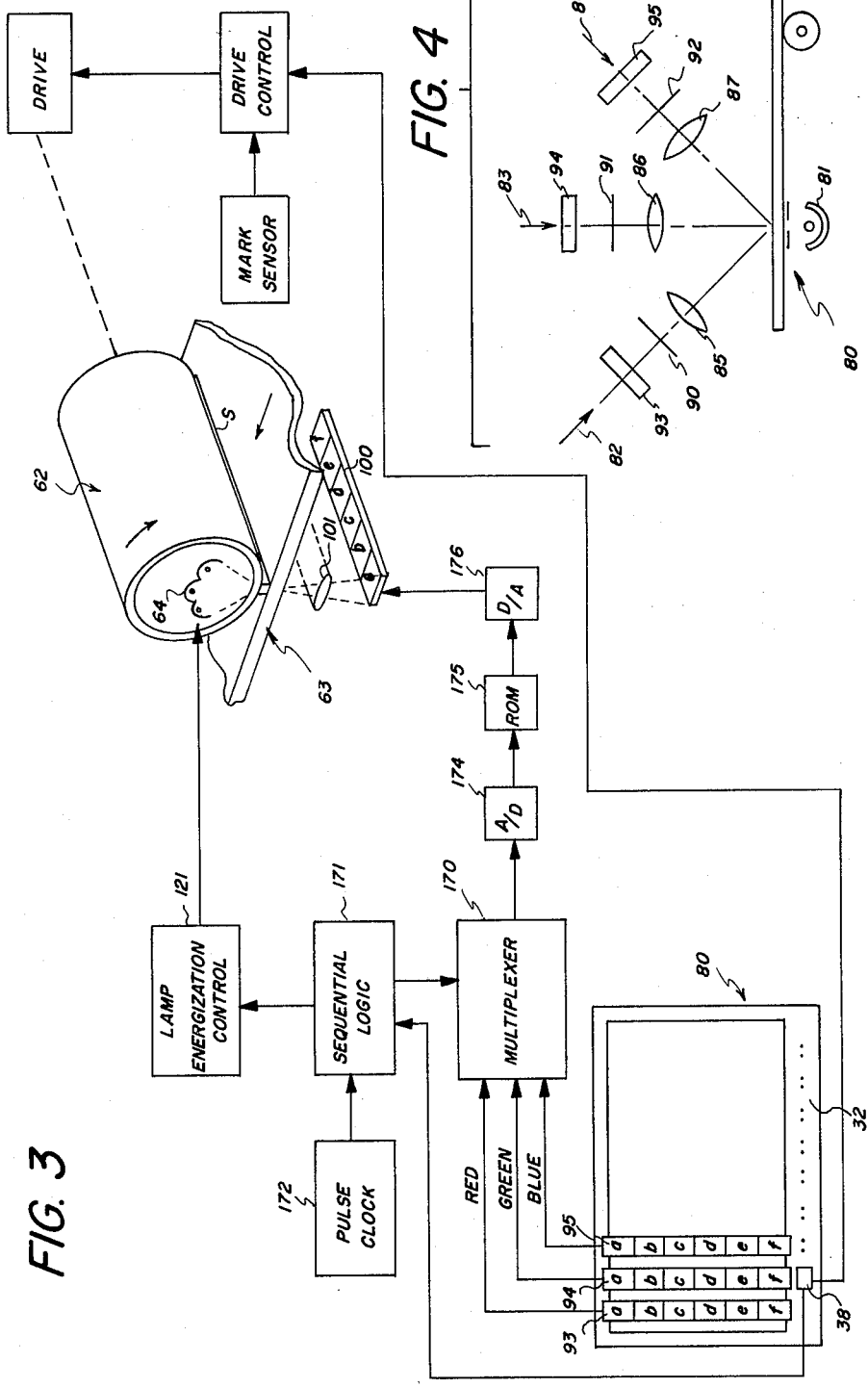
FIG. 3 is a schematic and block diagram of color imaging apparatus according to an alternative embodiment of the present invention.
FIG. 4 is a schematic side view of a portion of the apparatus shown in FIG. 3.

Referring to FIG. 1, the embodiment there illustrated comprises injecting electrode means denoted generally 2, blocking electrode means denoted generally 3, means for providing pulses of differently colored light denoted generally 4 and addressing means, denoted generally 5, for selectively activating the blocking electrode means.

More specifically the injecting electrode can be in the form of a transparent, hollow cylinder 7 supported by conventional means not shown for rotation about a longitudinal axis 8, by drive means 9, past an imaging station 10. The cylindrical wall is electrically conductive, at least in its outer peripheral portion which is adapted for connection to voltage source $V_1$. The cylinder 7 can be formed entirely of electrically conductive glass or formed of transparent plastic or glass with a thin electrically conductive outer layer. Supply means 11, such as a conventional coating hopper, is located adjacent the outer surface of the electrode 2 to supply a uniform layer of imaging mixture, e.g., a conventional photoelectrophoretic suspension, on the electrode as it is driven clockwise therepast.

The blocking electrode 3 can take the form of a platen which is mounted for translation past the image station 10 by drive means 9. It will be understood that the general injecting and blocking electrode configuration described above is conventional and that various different configurations for such electrodes are known in the art (e.g., two rotating cylinders). The present invention has utility with most such configurations, its general operative requirements being that the electrode configuration present successive strips of developer in a disposition for provision of migration field and light exposure and provide a surface to which the particles can migrate. As is known in the art the function as blocking or injecting electrode can be varied in different configurations by interchanging the electrical conductivity characteristics of the respective surface portions.

As shown more clearly in FIG. 2, the detailed structure of the blocking electrode 3 is not conventional. Specifically that electrode includes a photoconductive insulator layer 15 sandwiched between a radiation transparent conductive layer 16 and an opaque dielectric layer 17. As shown in FIG. 1, the opaque dielectric surface is located adjacent the imaging station 10 and the conductive layer is coupled to a terminal of voltage source $V_1$.

The illuminating means 4 can comprise three separately energizable sources $4_R$, $4_G$, $4_B$ respectively for providing different color light, e.g., red, green and blue. This can be implemented by separate flash lamps, reflectors and filters as shown or by various other structures which will be apparent to one skilled in the art. Such sources when sequentially energized provide time-separated pulses of their respective color light which are directed to successive strips of imaging mixture then located at the imaging station 10, e.g., by a linear lens element 19. One such strip S is shown in FIG. 1.

The electrode activating means 5 is, in the FIG. 1 embodiment, a laser radiation source 20 which is scanned by acoustooptic deflector cell 21 along the portion of the blocking electrode surface P that is opposite the strip S then at the imaging zone. The scanned laser beam is modulated in intensity, e.g., turned on and off by a conventional acoustooptic modulator device 22 in accordance with video information applied to that device.

Before proceeding with a description of the source of such video signal and the control circuitry for the FIG. 1 apparatus, a general functional description of the desired mode of operation of the structure described above is appropriate. Thus, to commence an imaging cycle, drive means 9 rotates and translates electrode means 2 and 3 respectively in the directions shown in FIG. 1 so that successive strips of suspension from hopper 11 are moved into the imaging station 10. During the period in which a given strip S is at the station the sources $4_R$, $4_G$ and $4_B$ are energized sequentially at least once so that the strip is subjected to time-separated, flood exposures of, e.g., red, green and blue light. Also, voltage $V_1$ is applied between injecting electrode 2 and blocking electrode 3. As is known in the art, migration imaging requires the coincidence of a migration inducing electrical field and exposure of the photosensitive particles to an activating light color. However, because of the unique electrode structure of the present invention a migration field toward the blocking electrode is not created simply by application of the voltage across electrodes 2 and 3. That is, photoconductive insulator layer 15 is constructed of sufficient thickness and resistivity that in its non-conductive condition it presents a barrier to the electrical potential at layer 16 of such magnitude that light activated particles will not migrate toward the blocking electrode. Thus, in accord with the present invention particle migration will not occur until a portion(s) of layer 15 is conductive. The character of radiation from laser 20 is selected to so activate photoconductor 15, i.e., render it conductive. Therefore by selectively exposing discrete portions of the photoconductor 15, corresponding discrete electrical fields can be provided for the pixels of strip S, and high resolution color imaging can be effected.

Specifically, as the laser beam from source 20 is scanned by deflector 21 across successive pixels of the strip P of photoconductor 15, successive corresponding pixels of the strip S will instantaneously be provided with migration fields. When such fields occur during an illumination pulse, e.g., from source $4_R$, the necessary conditions exist for the particles activated by red light to migrate to electrode 3 and a strip of, for example cyan particles, would migrate to blocking electrode. When the laser 20 is intensity modulated during such a strip scan of the photoconductor 15, e.g., in an on-off manner by a video signal to modulator 22, cyan particles can be caused to migrate to the blocking electrode pixel by pixel according to such off-on control by the modulator. It will be appreciated that successive addressing of the same strip during its sequential green and blue light exposures, will facilitate successive pixel by pixel migrations of, e.g., magenta and yellow particles. Thus by properly synchronizing the deflection of the laser beam and the energization of the sources $4_R$, $4_G$ and $4_B$ the pixels of a line can be individually addressed and when video signals are applied to modulator 22 in proper timed relation to such pixel scan by the laser beam, i.e., to provide off-on control thereof according to color separation information of an image to be reproduced, three-color imaging of that line will be effected. The sequence is of course repeated for each successive strip moving into the imaging station to provide a complete two-dimensional color image. After completion of such imaging the desired image can be removed from the electrode(s) by conventional means not shown.

With an understanding of the overall synchronization and control functions to be provided, the remaining portions of the FIG. 1 apparatus will be more easily understood. The station 30 is an example of one means for providing appropriate video signals to modulator 22. Thus, an original to be reproduced, e.g., a photographic negative 31, is supported on a transparent platen 32 which is moved past the scanning path of a panchromatic laser beam 33, deflected by acoustooptic deflector 34. Three linear detectors 34$_R$, 34$_G$ and 34$_B$ are provided below the scan path to receive light passing through the negative. The detectors can each comprise a linear photocell adapted to sense and signal the intensity of light of a particular color (e.g., passing to it from the negative through an appropriate red, green or blue filter). Thus as the laser beam scans a line of the negative, the red, green and blue information will be output respectively as a variable amplitude video signal from the detectors.

To properly relate the elements of the disclosed apparatus, several synchronization systems are needed. First, it is necessary that the original 31 and surfaces of the electrodes 2 and 3 be moved in properly timed relation. This can be accomplished by mark sensors 38 and 39 which detect the movement of platen 32 and electrode 3. Signals from those sensors are input to drive control 40, which in this embodiment controls drive 9 to synchronize movement of the electrodes with the movement of platen 32 by its drive 41.

Next considering the synchronization of the laser scan controls (i.e., deflectors 22 and 34) with the movement of the platen 32 and electrodes 2 and 3, such timing and control can conveniently be accomplished by sequential logic device 45, pulse clock 46, and signal generator 47. More particularly, in response to an actuating signal from sensor 38 (e.g., a line mark detection signal), the sequential logic device (e.g., a flip-flop, shift register or counter) provides a series of three sequential signals which actuate signal generator 47 to provide three respective line scans (e.g., by provision of successive frequency band sweeps to the deflectors). Pulse clock 46 provides a series of timing pulses to sequential logic device 45, which resets to an inactive state after each series of actuating signals. The scanning beams from laser 33 and laser 20 thus move synchronously across the original and photoconductor 15, three times per line.

Also, lamp control 50 can conveniently be controlled by sequential logic device 45 to provide a red, green or blue light pulse in synchronization with each of the three line scans by the laser 20. That is, successive digital signals from device 45 to control 50 can provide the successive energizations of lamp 4$_R$, 4$_G$ and 4$_B$ during the respective scans that are also controlled by device 45.

The activation of detectors 34$_R$, 34$_G$ and 34$_B$ should be in synchronism with the appropriate lamp energization and the line scans of lasers 33 and 20. This can be accomplished by providing successive digital signals from device 45 to a detector logic 52, each such signal respectively activating an appropriate detector (e.g., 34$_R$) to output its video signal to modulator 22 during energization of its corresponding lamp (e.g., 4$_R$) and thus during its corresponding line scans by deflectors 21 and 34.

Considering the foregoing it will be appreciated that the apparatus disclosed in FIG. 1 will provide three sequential, pixel-by-pixel addressings of each strip S of imaging suspension at the imaging station 10. During each such addressing a particular color flood exposure of the strip exists while the strip is activated pixel by pixel according to a video signal representing the pixel-by-pixel content of that color in the original to be reproduced. After completion of each successive line scan of the original and the accompanying imaging of successive suspension strips, the original is reproduced on the electrodes (one bearing a positive and one bearing a negative). Transfer of such reproduced images can be accomplished conventionally or, as is known, one electrode can bear a support during such imaging so that removal of the support (and fixing of the image is necessary) is all that is required.

With the foregoing, a more detailed explanation of one embodiment of the present invention, certain further information regarding useful and preferred features of the addressing electrode 3 will be useful. For example it is considered desirable that the photoconductive insulator layer 15 be chosen to have a high mobility carrier characteristic. Various conventional inorganic photoconductor materials, e.g., selenium, have this characteristic; however other photoconductors may be useful. In general, it is considered desirable to provide a thickness for such photoconductor in the order of about 10 times the thickness of the imaging dispersion. For example, preferred suspension layer thicknesses are in the range of from about 3-20 microns and corresponding preferred photoconductor layer thicknesses would be in the range of about 30 to 200 microns. The photoconductor should of course be chosen to be activatable by the wavelength of the addressing radiation source. A helium-neon laser is considered one such preferred source; however, many other photoconductor-activating sources matches exist.

The layer 17 should be selected from materials which yield minimum thickness, maximum electrical insulative effect and maximum opacity to the activating radiation wavelength. Sudan Black B dye in a coating vehicle is one preferred material. It is considered desirable to maintain the thickness of this insulating layer no more than 1 micron. It is desirable to operate the imaging procedure in a relatively high voltage mode, e.g., 500-1000 volts; however, even higher voltages may be preferred if suitable switching circuitry can be provided at reasonable cost.

In one preferred mode of operation it is desirable to discharge the photoconductive layer of trapped carriers between successive line scans. This can be accomplished by switching logic 48 which in response to signal generator 47 selectively connect layer 16 of electrode 3 to ground and by controlling deflector 21 and modulator 22 to allow a flood-exposure retrace between lines of information scan.

An alternative embodiment of the present invention, useful for providing concurrent address of pixels within a line, is shown schematically in FIG. 3. In this embodiment the blocking electrode 62 and injecting electrode 63 can be of the same construction as the FIG. 1 embodiment, as can illumination source 64. However, in this embodiment the pixel color detection is accomplished concurrently a line at a time. For this purpose the scanning station 80 shown in FIGS. 3 and 4 is used.

Station 80 can comprise a panchromatic light source 81 and separate photosensor systems 82, 83 and 84 located on the opposite side of the original. To provide color separation information, each photosensor system color separation information, each photosensor system respectively includes, a lens 85, 86 and 87, a color filter 90, 91 and 92 and a photocell 93, 94 and 95. The filter-photocell combination of each system is selected to provide information as to a different color separation component of the portion of original passing thereunder. For example, light from lamp 81 color modulated by the original 31, is focused by lens 85 onto photocell 93 passing through filter 90. Assuming system 82 to be a red color information sensor, the filter 90 is a red filter and the photocell 93 is redlight sensitive. Senor systems 83 and 84 can similarly be formed as green and blue information sensors respectively. As shown in FIG. 3, each of the photosensors 93, 94 and 95 respectively comprises a plurality of discrete photosensors a-f. Each of the discrete sensors 93a-f, 94a-f, and 95a-f detects color information from a pixel element of the original, one line at a time.

For effecting a concurrent address of all pixels comprising a given strip S of imaging suspension, a linear array 100 comprises of a number of discrete electrically-activatible light-emitting devices 100a-f, corresponding in number to the number of sensors 93a-f, 94a-f and 95a-f. Each discrete light-emitting device is separately addressable and light therefrom is focused by element 101 to a respective pixel on the photoconductor of electrode 63.

As shown in FIG. 3, the original 31 is supported for movement past the photosensor systems on a transparent platen 32 having timing marks thereon. A mark sensor 38 is supported in alignment with the path of movement of the timing marks, and can include, e.g., a light source on one side of platen 32 which directs light through the timing marks to a photocell on the other side. Similar detection marks can be placed on electrodes 62 and 63 and the signals fed to a drive and control system 103, e.g., such as disclosed in U.S. Pat. No. 4,044,248, for maintaining movement of the original and the electrodes in synchronization. In this embodiment the blocking electrode 63 is moved in optical synchronism with the movement of the original and various other synchronization techniques known in the art can be utilized to accomplish this result. In a preferred embodiment the electrode 62 also is moved to provide zero relative velocity with respect to contiguous portions of electrode 63, however, this is not essential. It is of course necessary that the periods of energization and non-energization of elements 100a-f be properly related to the movement of the original and blocking electrode 62 and with respect to the three exposure pulses from source 64.

For the above purpose a control circuit such as disclosed in FIG. 3 can be provided. As indicated in that figure the red, green and blue light intensity signals generated by a set of photosensors, e.g., 93a, 94a and 95a, that are associated with a corresponding electro-optic element, e.g., 100a, are directed to the input terminals of a conventional multiplexer logic package 170. The multiplexer 170 is controlled by a sequential logic device 171 such as a shift register, counter or flip flop, which provides sequentially three digital selection signals that control the successive output of the red, green and blue light intensity signals from multiplexer 170. A pulse clock 172 provides a series of synchronizing timing pulses to device 171 which resets to an inactivating condition after each series of red, green and blue outputs and remains inactive until the mark sensor 38 signals the commencement of another output of color information for the next successive line of the original. As shown, the device 171 also provides sequential digital signals to the light energization control 121 to control sequential actuation of the red, green and blue sources in synchronism with the red, green and blue color information output from the multiplexer 170.

Upon output from the multiplexer 170, the analog signal representative of the intensity, e.g., red light intensity of a pixel, is converted by an analog-to-digital converter 174 to a digital signal representative of the range of intensity within which the signal resides. This red intensity digital signal addresses a read only memory 175 which, in response provides to digital-to-analog converter 176 a digital signal indicative of the appropriate voltage to be impressed on the corresponding light emitting element during the red light exposure period t. That is, the extent of cyan particle deposition on imaged electrode 63 is proportional to the intensity of exposure. Therefore a tone scale for each color component can be provided by varying the voltage impressed across an element of array 100, which in turn controls the extent of light transmission through the element and thus the intensity of illumination of the pixel at the exposure station.

Upon receipt of the next clock pulse, the green light intensity signal would be output from multiplexer 170 through the conversion circuitry, in synchronism with actuation of the green illumination source. Similarly in response to the third clock pulse, the blue light signal would be output; and the next subsequent clock pulse will reset device 171 to its initial condition, awaiting initiation of another activating sequence by mark sensor 38, when the original has advanced another line.

It will be appreciated that signal processing and timing circuitry described above will exist for each aligned R, G and B photosensor set and its corresponding electro-optical element (i.e., 93a, 94a, 95a, and 100a ... 93f, 94f, 95f and 100f). Also it will be understood that the color information of a particular type, e.g., red, green or blue, is transmitted concurrently to each pixel in a given line. That is, first the output of photosensors 93a-f will transmit the red information to the elements 100a-f in synchronism with the red light pulse, then the sensors 94a-f will transmit green information to the elements 100a-f during the green light line exposure then sensors 95a-f will transmit the blue information to elements 100a-f during blue exposure. When this tricolor exposure sequence has been completed for each line of the original, a copy sequence is complete.

It will be apparent that the cumulative time for each series of three exposure periods t must not exceed the line period T, which will be equal to the exposure station width "W" divided by the velocity "V" of the imaged electrode surface. It is preferable, to obtain good color overlap, that $t < W/V$. This can be accomplished by proper selection of the clock pulse rate in conjunction with the rate of movement of the electrode 63.

Although the invention has been described with respect to a particular embodiment it will be appreciated that significant modifications and a wide variety of alternative structures can be utilized for practice of the present invention.

For example with proper signal delay and signal proportioning circuitry the analog signals from the photocells could be input directly across the electro-optical elements. Also in certain embodiments of the invention, tone scale might not be required and the read only memory and related converting circuitry could be eliminated. Further, if desired certain color correction functions could be effected by detecting qualities of the sensed original intensity signals electronically comparing those signals and providing compensation processing for the signals output to the electro-optical elements.

Other devices and modes can be used for achieving a color tone variation, or gray scale, if desired. For example, for off-on type electro-optical elements the electro-optical elements can be energized, during each pixel exposure period for each color of light, according to a variable duty cycle. That is, if a low density red component is desired for a pixel, the element be "on" (i.e., transmitting light of fixed intensity) only for a 10% duty cycle during that particular red light exposure period for the pixel. Similarly, if high red density was desired the duty cycle might be, e.g., 90%. At electrode speeds of about 10 inches per second pulse rates of about 1000 Hz and voltages of 0–500 volts have been found useful for this mode of practicing the present invention. Similarly, a stepped voltage signal can be provided for address to the elements during each pixel color exposure period and the elements selectively addressed by that signal during the stage of its period at which it is at the desired voltage level step.

The illumination source could also take alternative forms. For example, chopped pulses could be provided by rotating a filter cylinder, having red, green and blue light filter sections, around the longitudinal axis of a constant panchromatic light source. The rotation of the cylinder would then be timed with respect to the address of the electrodes. Or, a multicolor filter array could be translated past the exposure slit at an appropriate rate to provide properly timed light pulses.

Further, the present invention can readily be utilized to reproduce images which are electronically stored, e.g., on magnetic, thermoplastic or other such signal storage media. For example, images could be recorded in an electronic camera and, later, hard copy produced in accordance with the present invention.

The invention has been described in detail with particular reference to certain preferred embodiments thereof, but it will be understood that variations and modifications can be effected within the spirit and scope of the invention.

I claim:

1. Apparatus for color imaging with a layer of developer which contains electrophotosensitive particles of different color types, respectively sensitive to light of different colors, said apparatus comprising:
   (a) means for exposing successive strips of such a layer respectively to successive series of time-separated light pulses, the pulses in such series being respectively of said different light colors;
   (b) addressable electrode means adjacent such layer for providing discrete electrical fields across individual pixels of exposed strips in response to an activating electromagnetic radiation; and
   (c) means for selectively addressing pixels of said electrode means with activating electromagnetic radiation in a proper timed relation with said light pulses and in magnitude according to the color content of the image to be replicated so as to effect particle migration within said layer corresponding to said replicated image.

2. The invention defined in claim 1 wherein said electrode means includes a photoconductive insulator member sensitive to radiation in a predetermined wavelength range.

3. The invention defined in claim 2 wherein said addressing means includes means for scanning and modulating a beam of radiation in said predetermined wavelength range on said pixels.

4. The invention defined in claim 2 wherein said addressing means comprises a plurality of independent radiation sources each respectively aligned with one of said pixels.

5. Apparatus for color imaging with a layer of a developer which contains electrophotosensitive pigment particles of different color types, respectively sensitive to light in different wavelength ranges, said apparatus comprising:
   (a) illuminating means for uniformly exposing successive strips of such a developer layer respectively to series of time-separated light pulses, each series including different pulses respectively of light wavelength within the sensitivity range of one of said particle color types;
   (b) addressable electrode means, activatable by electromagnetic radiation, to selectively form discrete migration fields across such strips of the developer layer; and
   (c) means for addressing said electrode means with electromagnetic radiation in a timed relation with respect to said light pulses and in accordance with the pattern of an image to be reproduced.

6. The invention defined in claim 5 further including:
   means for sensing a color original to be reproduced and for providing line-by-line electrical signals representative of the information on such original; and
   means for controlling said addressing means in accordance with said signals.

7. The invention defined in claim 5 wherein said addressing means comprises means for scanning a radiation beam along said strip and for modulating the intensity of said beam.

8. The invention defined in claim 5 wherein said addressing means comprises a plurality of independently energizable radiation sources.

9. Apparatus for forming a multicolor image using a multicolor mixture of different particle types each having a distinct electrophotosensitivity, said apparatus comprising:
   (a) illuminating means for providing repetitive series of sequential light pulses directed to uniformly illuminate an elongated exposing area, such series each comprising a plurality of different light pulses, respectively of different wavelength ranges which correspond to the photosensitivity of one of such particle type;
   (b) photoconductive electrode means activatable by radiation in a given wavelength range;
   (c) second electrode means, supported opposite said photoconductive electrode means, for providing a migration surface and field in cooperation therewith; and
   (d) control means for exposing pixels of said photoconductive electrode means with radiation in said given wavelength range in an imagewise timed relation with respect to said light pulses such that migration of illuminated mixture between electrode means is effected in accordance with an image pattern.

10. The invention defined in claim 9 further comprising means for providing relative movement between said illuminating means and said photoconductive electrode means such that successive rows of transversely aligned pixels of said photoconductive electrode means are subjected in order to said series of pulses.

11. The invention defined in claim 10 wherein said control means includes means for sensing the color information of successive transverse lines of an original to be reproduced.

12. Apparatus for forming a multicolor image using a multicolor mixture of different particle types each having a distinct electrophotosensitivity, said apparatus comprising:
(a) means defining a strip exposure zone;
(b) means for providing successive quantities of such mixture at said exposure zone;
(c) illuminating means for providing repetitive exposure cycles, each including a plurality of sequential light pulses directed to uniformly illuminate said exposure zone, different light pulses in each of said cycles being of predetermined wavelength corresponding to the photosensitivity of one of such particle type;
(d) first, radiation-activatable, electrode means extending across said exposure zone;
(e) second electrode means, supported opposite said first electrode means;
(f) a plurality of independently actuatable radiation sources aligned to expose discrete pixels of said first electrode means;
(g) signal means for providing successive groups of parallel signals, each group comprising the information for one line of an image; and
(h) control means responsive to said signals for energizing each of said radiation sources in an imagewise time relation with respect to said light pulses.

13. The invention defined in claim 12 wherein said signal means includes means for sensing the color density values of successive lines of an original to be reproduced and said control means includes means for regulating the extent of energization of said sources in response to signals from said sensing means.

14. Apparatus for forming a color image using a color photoelectrophoretic suspension containing different photoconductive particle types, each type having unique color and light sensitivity characteristics, said apparatus comprising:
(a) an image electrode mounted for movement past an imaging zone;
(b) illuminating means for providing successive series of time-separated light strip pulses extending across said imaging zone, each series including at least one pulse of uniform light corresponding uniquely to the light sensitivity characteristic of one particle type of such suspension;
(c) a photoconductive electrode array including a plurality of separately energizable pixel areas that are generally coplanar and supported opposite said image electrode;
(d) means for discretely actuating each of said pixel areas by exposure to activating radiation;
(e) means for synchronizing the movement of said image electrode and the energization of said illumination means so that at least one series of pulses occurs per line of said image to be reproduced;
(f) signal means for providing successive groups of recording signals, each group containing the information for a line of the image to be reproduced; and
(g) means for receiving such recording signals and for controlling exposure by said actuating means in synchronization with said light strip pulses and in accordance with said recording signals to effect line-by-line formation of a color image.

15. Apparatus for forming color images using a developer mixture of electrophotosensitive pigment particles of different color types, each type respectively being sensitive to light of different wavelength ranges, said apparatus comprising:
(a) means for providing successive series of time-separated, uniform light pulses, each such series illuminating an exposure strip, different pulses in each series uniquely corresponding in wavelength to the sensitivity range of one of said particle color types;
(b) photoconductive electrode means, aligned with said illuminating means, for forming a plurality of discrete, selectively energizable electrical fields located at close intervals along successively illuminated exposure strips;
(c) means for supplying successive quantities of such developer mixture respectively within successively illuminated exposure strips; and
(d) control means for exposing said electrode means with activating radiation in timed relation with said light pulses to energize said discrete fields in accordance with the particular color image to be formed.

16. The invention defined in claim 15 further comprising second electrode means opposite said addressable electrode means and wherein said developer supplying means comprises means for forming a layer of such developer on one of said electrode means.

17. Apparatus for forming a color image using a color photoelectrophoretic suspension of the kind containing different photoconductive particle types that have distinct color and light sensitivity characteristics, said apparatus comprising:
(a) means defining a strip-shaped imaging zone;
(b) a first electrode surface mounted for movement across the width of said imaging zone, the rate of such movement and width of said imaging zone establishing a line exposure period;
(c) illuminating means for providing successive series of time-separated light pulses on said imaging zone, each series including pulses of different colors which individually activate respective particle types of such suspension;
(d) a photoconductive electrode array comprising a plurality of closely spaced pixel areas discretely activatable by radiation in a given wavelength range aligned along the length of said imaging zone;
(e) means for supplying successive quantities of such suspension at said imaging zone during respective line exposure periods;
(f) signal means for providing successive groups of recording signals, each group containing the information for a line of the image to be reproduced;
(g) means for synchronizing energization of said illuminating means with movement of said first electrode surface so that at least one series of color pulses occurs during each line exposure period; and
(h) means for receiving such recording signals and exposing the pixel areas in said array to activating radiation in synchronization with color pulses and in accordance with said recording signals to effect line-by-line formation of a color image.

18. The invention defined in claim 1 wherein said electrode means includes a photoconductive insulator layer which is sensitive to radiation in a predetermined wavelength range sandwiched between a conductive layer which is generally transparent to radiation in said wavelength range and a dielectric layer which is generally opaque to radiation in said wavelength range.

19. The invention defined in claim 18 wherein the thickness of said dielectric layer is less than about 1 micron.

20. A method of forming color images using a developer mixture of electrophotosensitive pigment particles of different color types, each type respectively being sensitive to light in different wavelength ranges, said method comprising:
 (a) flood exposing successive strips of such developer mixture, each to a series of time separated light pulses, different pulses in each such series uniquely corresponding in wavelength to the sensitivity range of one of said particle color types;
 (b) positioning a photoconductive electrode adjacent such successive strips; and
 (c) exposing discrete pixels of said electrode with activating radiation in timed relation with the flood exposure pulses and in accordance with the color content of the particular color image to be formed so as to effect particle migration within said layer corresponding to such image.

* * * * *